June 7, 1932.  G. S. TIPTON  1,862,286

VEHICLE BODY

Original Filed Aug. 30, 1928

INVENTOR.
GUY S. TIPTON,

BY
ATTORNEYS.

Patented June 7, 1932

1,862,286

UNITED STATES PATENT OFFICE

GUY S. TIPTON, OF KNIGHTSTOWN, INDIANA, ASSIGNOR TO KNIGHTSTOWN FUNERAL CAR COMPANY, OF KNIGHTSTOWN, INDIANA, A CORPORATION

VEHICLE BODY

Application filed August 30, 1928, Serial No. 302,928. Renewed April 8, 1932.

This invention relates to a vehicle body and particularly to means for assisting in the side loading of a relatively heavy structure, and, as shown herein, it is applicable to a side loading hearse for guiding a casket into position. However, as will be apparent from the following description, it is equally applicable to other types of vehicle having the same loading conditions and similar heavy structures to be loaded.

The principle object of the invention resides in the provision of supporting and guiding elements in the floor of the vehicle which will tend to swing the casket or similar structure into longitudinal position with respect to the body.

The principal feature of the invention resides in the provision of a plurality of universal bearing supports which freely permit the swinging movement of the structure, in combination with a plurality of guide rollers which will tend to swing the forward end of the structure toward the rear of the vehicle but resist lateral movement thereof while freely permitting longitudinal movement.

The full nature of the invention will be more clearly understood from the accompanying drawing and the following description and claim.

Figure 1:
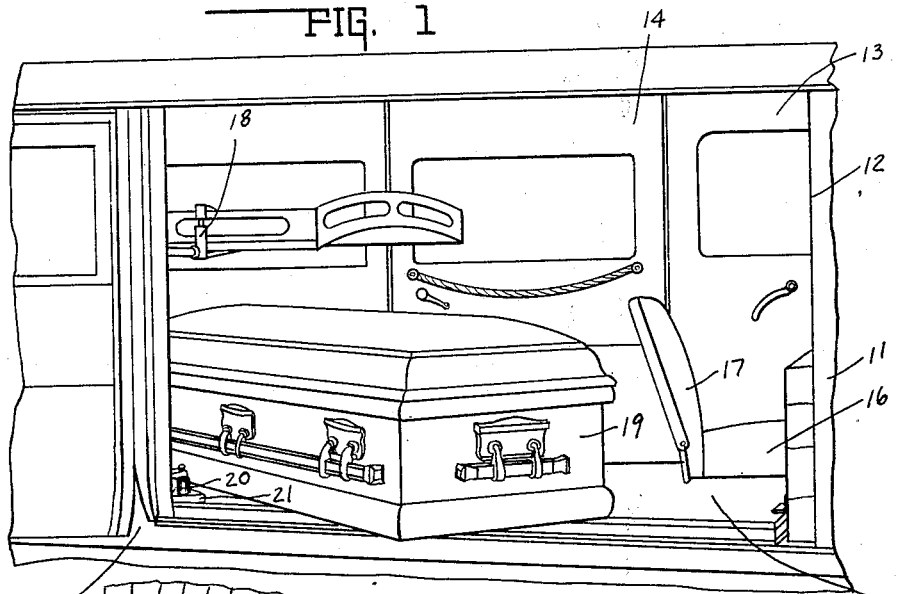
Figure 2:
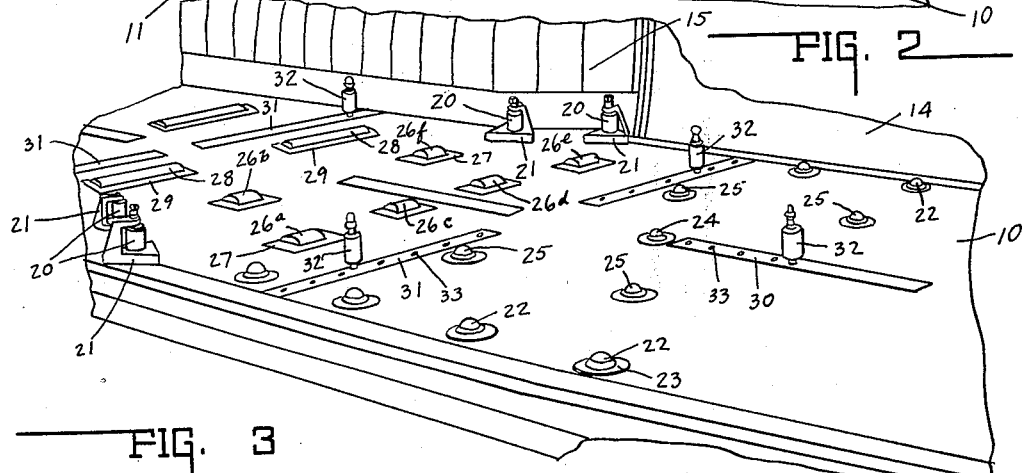
Figure 3:
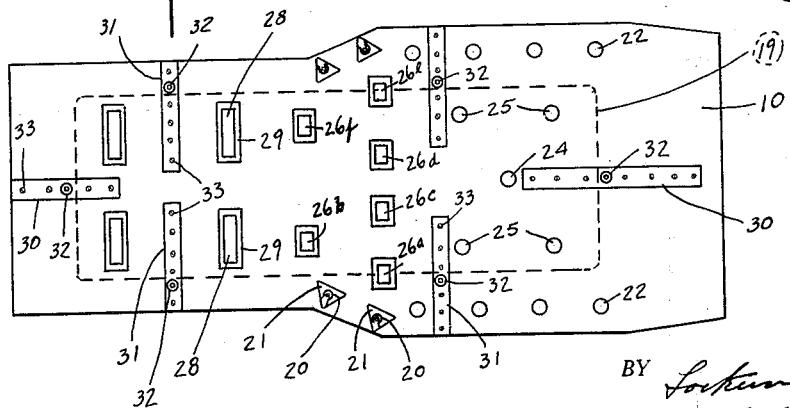

Fig. 1 is a perspective view of the interior of a side loading hearse through one side thereof, and with a casket at the entrance. Fig. 2 is a perspective view of the antifriction constructions employed in the hearse in their normal positions. Fig. 3 is a floor plan of the hearse with the casket shown dotted therein.

In the drawing 10 indicates the floor or base of a side loading hearse having sides 11 which include near the forward portion a single opening 12 of substantially double the normal door width. Said opening is closed by a pair of oppositely hinged doors 13 and 14, the front door 13 being hingedly mounted at its forward edge and swinging outwardly and forwardly and the rear door 14 being hingedly mounted at its rearward edge and swinging outwardly and rearwardly, said doors have a cooperating connection so that when both are opened there is provided a single opening through which the casket may be introduced into or removed from the hearse body.

The interior of the hearse is suitably upholstered rearwardly of the opening and along the side as at 15 and the seat 16 has a collapsible back 17 and is hingedly mounted and is adapted to tilt forwardly so as to be removed from in front of the opening. A pair of seats are provided and sufficient clearance is provided by tilting but one of the seats, as shown in Fig. 1. The hearse also may be provided with the usual supports 18 for supporting the flower trays and the like in superposed relation to the casket which is indicated by the numeral 19 in Fig. 1.

As shown in the several figures adjacent each of the rearward edges of the side openings, there is provided a suitable vertically mounted side roller 20 mounted in the bracket 21. This assists in guiding the casket in its movement into and from the hearse. Immediately adjacent the opening there is provided a parallel series of universal bearing supports in the form of ball bearings 22 rotatably mounted in the bearing plates 23. Between the two parallel series of ball bearings there are provided additional ball bearings of the same character and geometrically arranged with a central ball bearing 24, and a pair of side ball bearings 25.

In loading the casket the forward edge is placed upon the ball bearings 22 adjacent the opening and the casket is then pushed into the hearse, engaging ball bearings 25 and 24 and the side roller 20. As the casket engages the side roller 20, its forward end bears progressively upon a plurality of laterally extending short guide rollers 26$^a$, 26$^b$, 26$^c$, 26$^d$, 26$^e$, and 26$^f$, each of which is suitably mounted in their respective bearing plates 27 positioned in and supported by the base 10 of the hearse. Rearwardly of the short guide rollers there are an additional series of relatively long supporting rollers 28 similarly mounted in the bearing plates 29.

The usual retaining plates 30 and 31 are provided, each of which removably mounts an upright pin 32 receivable by one of the openings 33 therein. Said pins when properly positioned engage the casket and prevent any movement in the hearse during transportation.

From the foregoing, it will be noted that as the casket or similar heavy structure is pushed into the vehicle in the right hand opening as shown in Fig. 1, it will first roll upon the universal bearing supports 22. As the forward end of the casket progresses it will engage and be supported upon the universal bearings 25. Thereupon the left hand corner of the casket will engage the guide roller 26ᵃ, and the right hand corner will bear upon the ball bearing 24. By reason of the guide roller 26ᵃ extending laterally of the vehicle, the movement of the casket in the lateral direction will be resisted by the friction of said roller, whereas the component movement longitudinally of the vehicle will be freely permitted so that it has a tendency to swing to the left. Continued inward movement of the casket will cause the forward edge to first engage the horizontal guide roller 26ᵇ which will further tend to give it free movement longitudinally of the vehicle while resisting lateral movement, thus swinging it to the rear of the vehicle. Thereupon it successively engages the guide rollers 26ᶜ, 26ᵈ, 26ᵉ, and 26ᶠ. This group of relatively short horizontal guide rollers will resist lateral movement of the casket while freely permitting longitudinal movement. The engagement of the casket by the side roller 20 will cause its rear end to swing inwardly upon the ball bearings 22, 24 and 25. Wherefore, the group of relatively short and laterally extending guide rollers 26 will then carry the casket into longitudinal position and swing its rear end laterally and inwardly, which is freely permitted by the universal bearing supports 22, 24 and 25.

The invention claimed is:—

In a hearse having a casket compartment, with a pair of door openings on opposite sides and near the forward portion of the compartment which extends rearwardly therefrom, and a door for each opening, the combination of a plurality of substantially vertically positioned anti-friction rollers at each side of and adjacent each door opening, the axis of the rollers adjacent each opening lying in a vertical plane at an angle to a vertical plane including the longitudinal axis of the compartment, the rollers upon opposite sides co-operating to turn the casket rearwardly into the compartment, a plurality of elongated floor rollers for casket support purposes mounted upon horizontal axes and transverse to the longitudinal axes of the compartment and upon opposite sides thereof and at the rear of the compartment, a plurality of anti-friction floor balls positioned immediately adjacent and along each door opening, other floor balls interposed centrally between the opening positioned balls and arranged in substantially triangular relation with the same and with a substantially centrally positioned apex ball for permitting universal turning of the casket into longitudinal alignment without interference following lateral insertion and a plurality of short floor rollers positioned forwardly of the elongated rollers and rearwardly of the balls and arranged in spaced relation and in a plurality of rows in transverse alignment to the longitudinal axis of the compartment for cooperation with the vertically positioned guide rollers for casket guidance in the insertion and withdrawal of the casket, as well as supporting the same, said short rollers being triangularly arranged upon opposite sides of the compartment axis and with the apexes rearwardly of the base.

In witness whereof, I have hereunto affixed my signature.

GUY S. TIPTON.